United States Patent
Koba

(10) Patent No.: US 6,226,055 B1
(45) Date of Patent: *May 1, 2001

(54) PROJECTOR

(75) Inventor: Hiroki Koba, Higashiosaka (JP)

(73) Assignee: Sanyo Electric Co., Ltd., Moriguchi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,314

(22) Filed: Feb. 24, 1999

(30) Foreign Application Priority Data

Feb. 26, 1998 (JP) ................................. 10-044737

(51) Int. Cl.⁷ ..................... G02F 1/1335; G03B 3/00; G02B 7/02
(52) U.S. Cl. ........................ 349/5; 359/819; 353/101
(58) Field of Search ................. 349/5, 6; 359/435, 359/554, 556, 557, 808, 809, 810–819; 353/101, 100, 102, 38

(56) References Cited

U.S. PATENT DOCUMENTS

| | | | |
|---|---|---|---|
| 3,359,849 | * 12/1967 | Friedman | 359/428 |
| 5,398,132 | * 3/1995 | Otani | 359/557 |
| 5,751,396 | * 5/1998 | Masuda et al. | 351/221 |
| 5,777,340 | * 7/1998 | Ueno | 351/206 |
| 5,865,521 | * 2/1999 | Hashizume et al. | 353/101 |
| 5,889,576 | * 3/1999 | Fujieda | 351/206 |
| 5,917,460 | * 6/1999 | Kodama | 345/8 |
| 5,917,653 | * 6/1999 | Taniguchi | 359/557 |

FOREIGN PATENT DOCUMENTS 4-65594   10/1992  (JP).

* cited by examiner

Primary Examiner—William L. Sikes
Assistant Examiner—Dung Nguyen
(74) Attorney, Agent, or Firm—Armstrong, Westerman, Hattori, McLeland & Naughton, LLP

(57) ABSTRACT

A projector comprises as mounted on a chassis a light source, a projection lens for projecting light on a screen, dichroic mirrors positioned on an optical path from the light source for separating light into R, G and B, and a relay lens disposed on the longest of optical paths of R, G, B and interposed between the dichroic mirror and the projection lens for causing the light on the longest path to reach the projection lens. An adjusting mechanism is mounted on the chassis for moving the relay lens upward, downward, leftward or rightward in a plane orthogonal to the optical path thereof. The relay lens is moved for adjustment to make the corresponding irradiating light to be incident on the liquid-crystal panel within a minimum required range of irradiation.

2 Claims, 5 Drawing Sheets

PROJECTOR

FIELD OF THE INVENTION

The present invention relates to projectors by which images displayed on a liquid-crystal panel, or the like, are projected on a screen.

BACKGROUND OF THE INVENTION

FIG. 7 shows a projector already proposed which comprises three liquid-crystal panels 7, 7a, 7b corresponding to R, G, B, such that the panels are irradiated with beams from a light source 35 to project color images by combining the beams passing through the liquid-crystal panels. In the following description, a beam, opposite ends of which are parallel to the optical axis, will be referred to as parallel rays.

Inside a chassis 3, the liquid-crystal panels 7a, 7b corresponding respectively to B and R are arranged as opposed to each other on opposite sides of the optical axis of a projection lens 67, and a prism body 30 is disposed between the two liquid-crystal panels 7a, 7b. The prism body 30 has, in its interior, reflecting planes 31, 32 orthogonal to each other. The liquid-crystal panel 7 corresponding to G is disposed at one side of the prism body 30 opposite to the projection lens 67.

The light source 35 is provided at an optical path inlet for the chassis 3, and a condenser lens 79 for concentrating light is disposed inwardly of the light source 35. Arranged on the optical path, inclined with respect thereto, are total reflection mirrors 75, 76, 77, 78 and dichroic mirrors 45, 46. The dichroic mirror 45 passes B while reflecting G and R. The dichroic mirror 46 reflects G while passing R.

B passing through the dichroic mirror 45 is reflected at the total reflection mirror 76, irradiates the liquid-crystal panel 7a corresponding to B, and is caused to impinge on the projection lens 67 by the reflecting plane 32 within the prism body 30. R is reflected from the total reflection mirrors 77, 78 and thereafter incident on the projection lens 67 upon reflecting at the plane 31 within the prism body 30. Thus, R, G, B to be incident on the projection lens 67 are combined by the prism body 30.

With the projector of FIG. 7, the optical path length of R is greater than those of G and B. It is therefore likely that R, emanating from the light source 35 and separated off, will diffuse before reaching the liquid-crystal panel 7b, failing to fully irradiate the liquid-crystal panel 7b.

To obviate this problem, convex lenses called relay lenses 80, 8, 81 are fixedly mounted on the chassis 3 between the dichroic mirror 46 and the liquid-crystal panel 7b to sufficiently irradiate the panel 7b corresponding to R. Of the three relay lenses 80, 8, 81, the middle relay lens 8 serves to make the emanating light into approximately parallel rays.

However, the above projector has the following problems.

The optical path is likely to deflect from the normal position owing to variations in the dimensions of optical components, such as lenses and mirrors, mounted on the chassis 3 and to errors involved in mounting. R, with an elongated optical path, is especially susceptible to this influence.

A minimum required range of irradiation is predetermined for liquid-crystal panels of the type mentioned. Suppose the minimum required range is a range A indicated in a solid line in FIG. 2. If the optical path is deflected from the normal position, the light incident on the liquid-crystal panel 7b will irradiate a range A1 of broken line, as displaced from the range A.

Consequently, R will not be accurately combined with the other rays G, B, producing color irregularities in the composed image, whereas the relay lenses 8, 80, 81, which are fixed to the chassis 3, are not adjustable for correcting the deflection of the optical path. For this reason, it has been conventional practice to set a wide range A2 including A and A1 and shown in FIG. 2 for irradiating the liquid-crystal panel 7b, and to set irradiation ranges A2 also for the other liquid-crystal panels 7, 7a.

Thus, color irregularities in the projected composite images are precluded by superposing R, G, B, with the ranges of irradiation made wider than should be set.

When the light source 35 has constant brightness, the brightness per unit area, i.e., illuminance, on the screen is inversely proportional to the square of the area of the irradiation range, as is well known, so that the illuminance is lower than is intended if a wider irradiation range is set.

Nevertheless, a higher illuminance is required of projectors of the type mentioned. The conventional projector, wherein the irradiation range is wider than is needed, fails to fulfill this requirement. In view of this point, the present applicant has conceived the idea of achieving a higher illuminance by adjusting the position of the relay lens to set a minimum required range of irradiation for the liquid-crystal panel 7b.

SUMMARY OF THE INVENTION

An object of the present invention is to realize a higher illuminance in a projector.

The present invention provides a projector which comprises an adjusting mechanism 5 mounted on a chassis 3. A relay lens 8, provided on the longest optical path, is moved upward, downward, leftward or rightward in a plane orthogonal to the optical path by manipulating the adjusting mechanism 5. When thus moved, the relay lens 8 permits light to be incident on a liquid-crystal panel 7b within a minimum required range of irradiation.

As shown in FIG. 3A, light is likely to be incident, as deflected on the relay lens 8, for example, owing to an error involved in mounting optical components inside the chassis 3. As a result, the liquid-crystal panel 7b will be irradiated at a portion deflected from the minimum required range of irradiation. In this case, the relay lens 8 is adjusted leftward, rightward, upward or downward in a plane orthogonal to the optical path. Since the relay lens 8 is a convex lens, the angle of refraction of light differs with the position at which the light is incident on the relay lens 8. Thus, the range of irradiation of the liquid-crystal panel 7b can be altered by moving the relay lens 8 as shown in FIG. 3B.

Since the liquid-crystal panel 7b can be irradiated accurately over the minimum required range of irradiation, there is no need to widen the irradiation range of the liquid-crystal panel 7b more than is necessary as conventionally practiced. This serves to diminish the conventional irradiation range of the liquid-crystal panel 7b to prevent a reduction in the illuminance of irradiation images.

DETAILED DESCRIPTION OF THE PREFERRED EMBODIMENT

Figure 1:
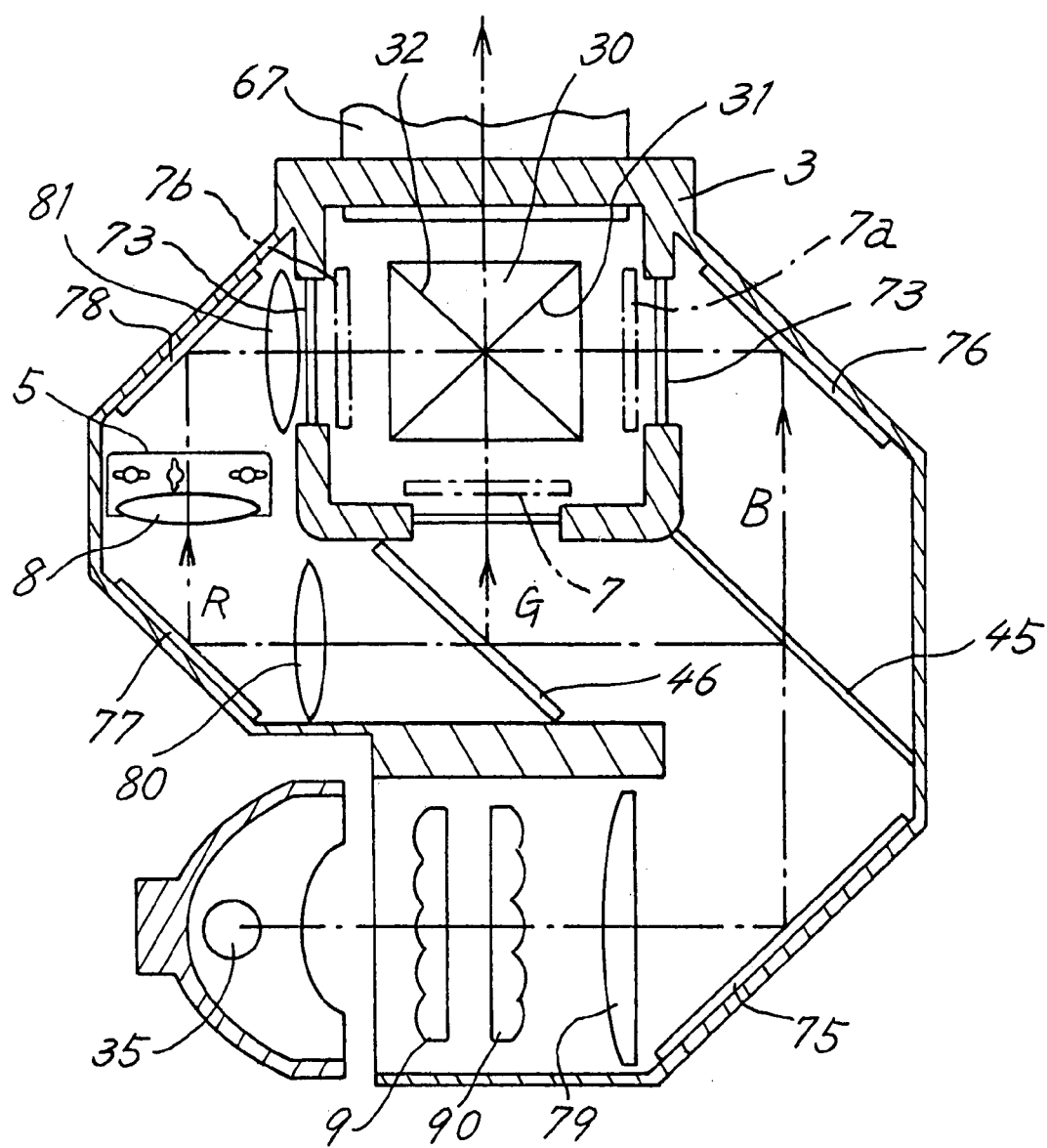
FIG. 1 is a plan view of a chassis according to the present invention.
Figure 2:
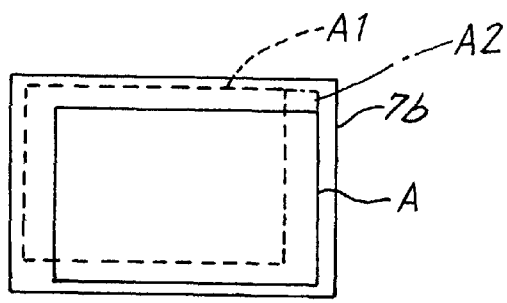
FIG. 2 is a diagram showing deflection of an irradiation image.

An embodiment of the present invention will be described below in detail. Throughout the drawings, like parts are designated by like reference numerals.

Figure 7:
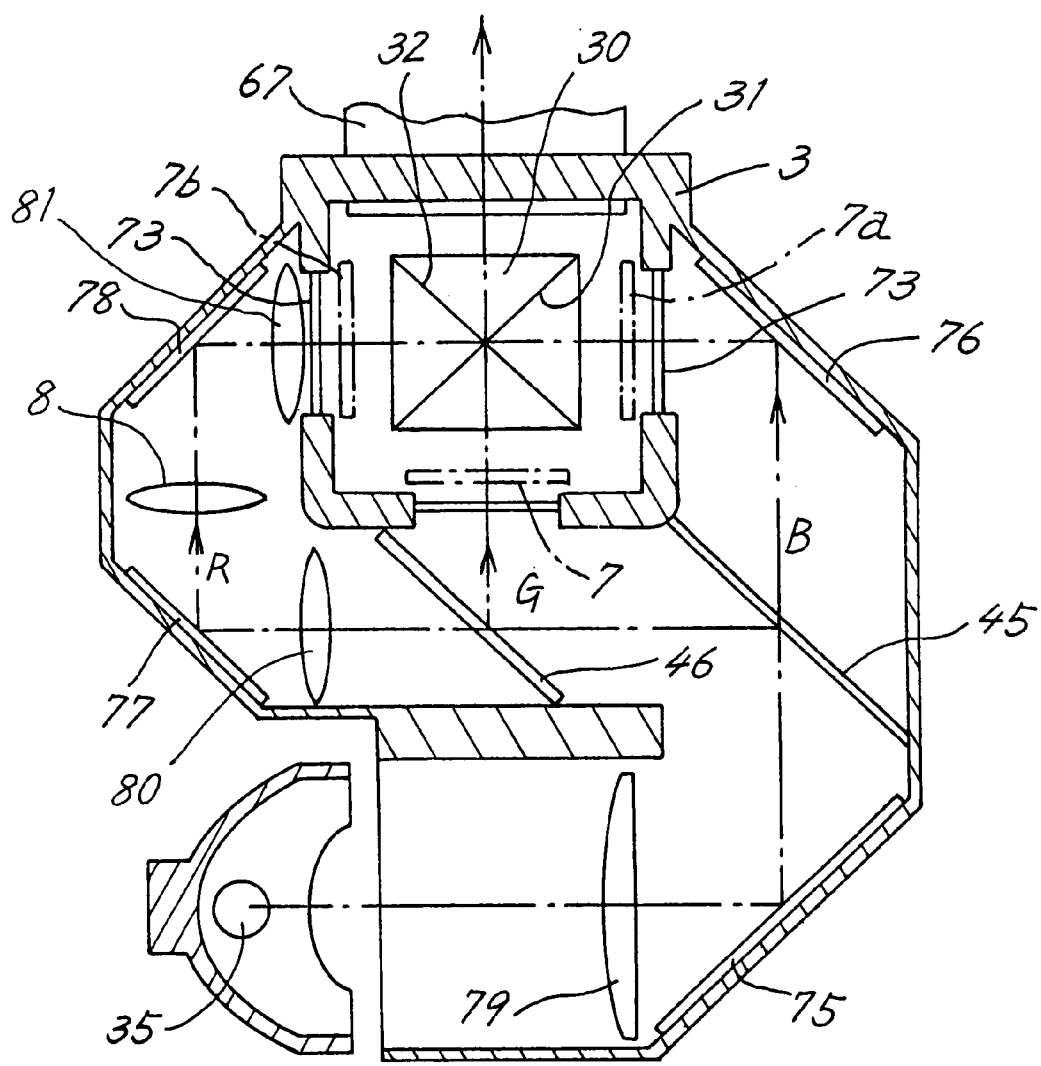
FIG. 7 is a plan view of a conventional chassis.

FIG. 1 is a plan view showing a chassis 3 of a projector embodying the invention. Total reflection mirrors 75, 76, 77, 78, dichroic mirrors 45, 46 and prism body 30 are arranged in the same manner as in the conventional projector shown in FIG. 7. The total reflection mirrors 75, 76, 77, 78 are attached to the inner side of side wall of the chassis 3. Beams passing through liquid-crystal panels 7b, 7, 7a for R, G, B are combined by the prism body 30.

A plurality of relay lenses 8, 80, 81 are arranged between the dichroic mirror 46 and the liquid-crystal panel 7b as in the prior art. One of these lenses, i.e., the relay lens 8, is provided with an adjusting mechanism 5. For fine adjustment, the mechanism 5 moves the relay lens 8 upward, downward, leftward or rightward in a plane orthogonal to the optical path, whereby the light from a light source 35 is passed through lens plates 9 and 90 and is adapted to irradiate the liquid-crystal panel 7b over a minimum required range of irradiation.

Details of the Adjusting Mechanism

Figure 4:
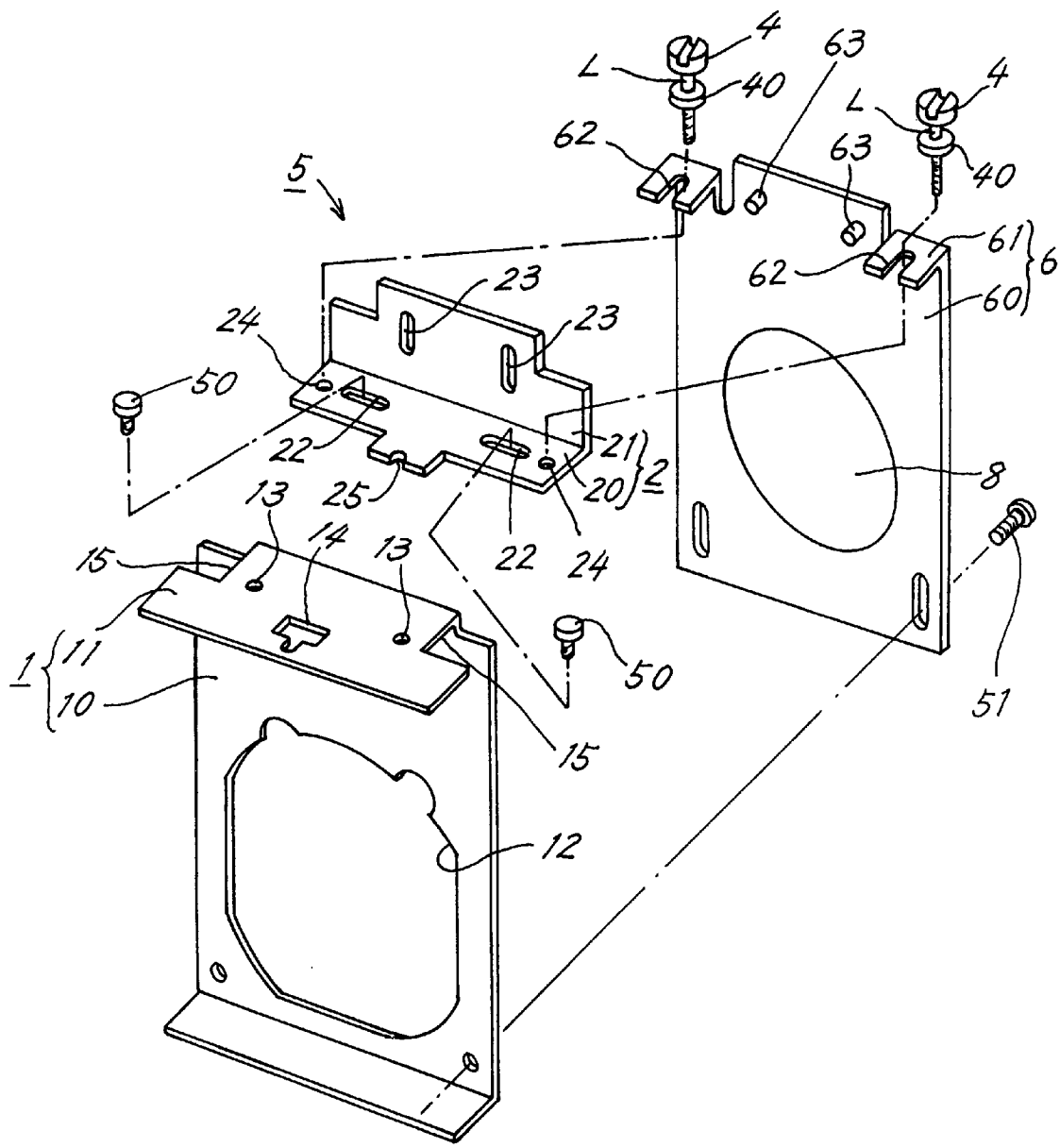
FIG. 4 is an exploded view of an adjusting mechanism.

FIG. 4 is an exploded view of the adjusting mechanism 5, which resembles the mechanism previously disclosed by the present applicant in JP-A No. 61782/1997. The adjusting mechanism 5 comprises a fixed piece 1 fixed to the chassis 3, a first movable piece 2 movable leftward or rightward, and a second movable piece 6 movable upward or downward. Each of these pieces is formed by bending a metal plate. The fixed piece 1 comprises a vertical plate 10 orthogonal to the optical path and attached vertically to the upper wall of the chassis 3, and a horizontal plate 11 extending horizontally from the upper end of the vertical plate 10. The vertical plate 10 is formed with an opening 12 for the relay lens 8 to fit in. The horizontal plate 11 has threaded bores 13, 13 formed at opposite side portions thereof, and an adjusting hole 14 at an outer end portion for use in adjusting the first movable piece 2 leftward or rightward. Cutouts 15, 15 are formed in the horizontal plate 11 at opposite sides of its base end. The lower end of an adjusting screw 4 which will be described below is fittable in the cutout 15.

The first movable piece 2 comprises a lateral plate 20 placed on the horizontal plate 11 of the fixed piece 1, and an upright plate 21 upstanding from the lateral plate 20. The lateral plate 20 is formed with first slots 22, 22 extending laterally transversely of the optical path, and the upright plate 21 has second slots 23, 23 extending vertically. Screws 50, 50 are inserted through the first slots 22, 22 and screwed into the threaded bores 13, 13, respectively, whereby the first movable piece 2 is allowed to move leftward or rightward. The lateral plate 20 is formed with a threaded bore 24 positioned outwardly of each first slot 22, and with a recessed portion 25 in the middle of a free end thereof.

The second movable piece 6 comprises a support frame 60 carrying the relay lens 8 and having lugs 61, 61 projecting from opposite sides of its upper end toward the fixed piece 1. A groove 62 is formed in each lug 61. Pins 63, 63 extend from upper end portions of the support frame 60 toward the first movable piece 2. The pins 63, 63 fit in the respective second slots 23, 23 of the first movable piece 2, whereby the second movable piece 6 is allowed to move upward or downward.

The adjusting screw 4 fits in the groove 62 of the second movable piece 6. The screw 4 has a flange 40 spaced apart from the underside of its head by a clearance L, and the lug 61 tightly fits in the clearance L. In this state, the threaded portion of the screw 4 is screwed in the threaded bore 24 of the first movable piece 2. When the two adjusting screws 4, 4 are rotated at the same time, the second movable piece 6 moves upward or downward. The second movable piece 6 as adjusted is fastened to the fixed piece 1 with screws 51.

Figure 5:
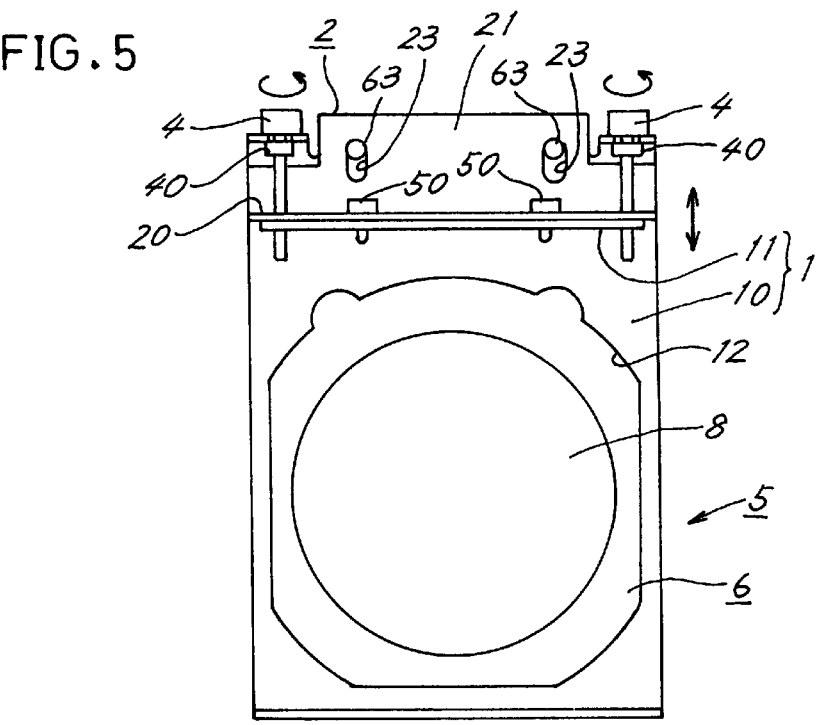
FIG. 5 is a front view of the adjusting mechanism.
Figure 6A:
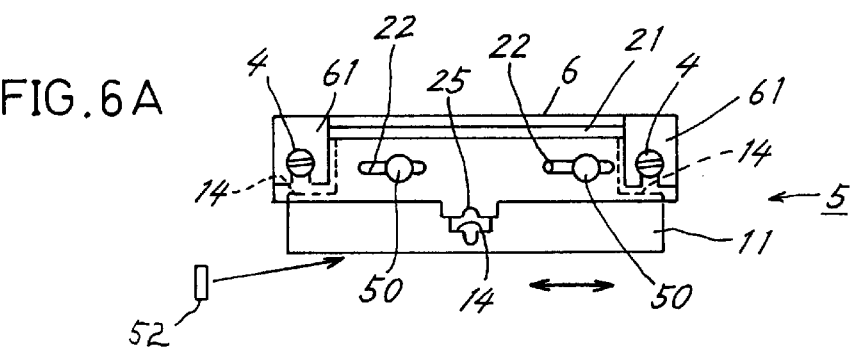
FIG. 6A is a plan view of the adjusting mechanism before adjustment.
Figure 6B:
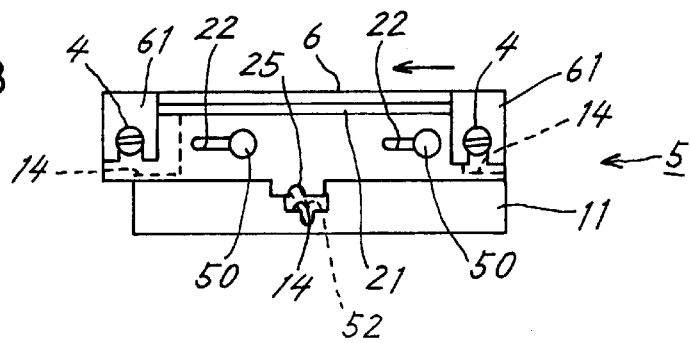
FIG. 6B is a plan view of the adjusting mechanism after adjustment.

FIG. 5 is a front view of the adjusting mechanism 5, and FIGS. 6A and 6B are plan views of the same. To move the relay lens 8 upward or downward, the two adjusting screws 4, 4 are rotated, with the first movable piece 2 locked against lateral movement by tightening up the screws 50, 50. The second movable piece 6 having the relay lens 8 mounted thereon moves upward or downward along the second slots 23, 23. The lower end of each adjusting screw 4 fits in the cutout 15 of the fixed piece 1 and will not hamper the vertical movement of the screw 4.

To move the relay lens 8 leftward or rightward, the screws 50, 50 fastening the first movable piece 2 to the fixed piece 1 are loosened, and a jig 52, such as a slotted screwdriver, is inserted between the recessed portion 25 of the first movable piece 2 and the end portion of the horizontal plate 11 defining the adjusting hole 14. The jig 52 comes into contact with opposite side edges of the recessed portion 25. When the jig 52 is twisted, the second movable piece 6 moves leftward or rightward as shown in FIG. 6B, with the adjusting hole 14 remaining unmoved since the hole 14 is formed in the fixed piece 1.

Figure 3A:
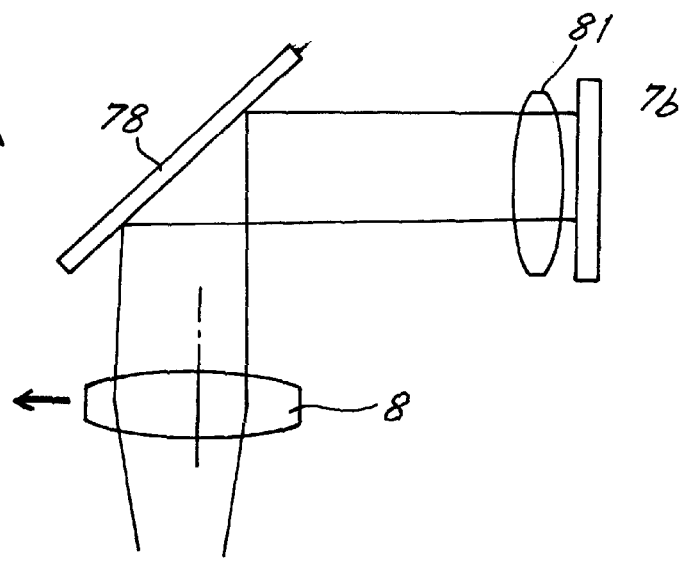
FIG. 3A is a diagram showing a relay lens before adjustment.

If the liquid-crystal panel 7b is not irradiated within the minimum required range of irradiation, the relay lens 8 is moved leftward or rightward, or upward or downward as shown in FIG. 3A by finely adjusting the first or second movable piece 2 or 6.

Figure 3B:
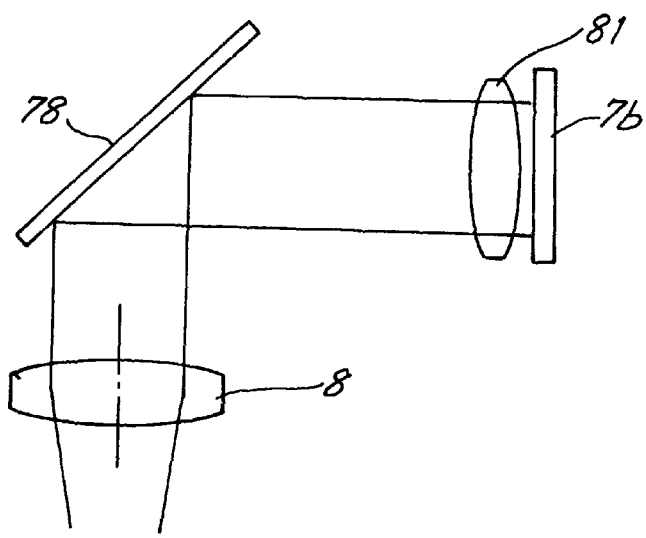
FIG. 3B is a diagram showing the relay lens, as adjusted according to the invention.

The relay lens 8 has a curved incidence surface, and the angle of refraction of light differs with the position where the light is incident on the lens 8. The irradiation range of the liquid-crystal panel 7b can be altered, as shown in FIG. 3B, by moving the relay lens 8 in this way.

Even if the incident light on the liquid-crystal panel 7b of the present device is deflected from the intended range of irradiation, the irradiation range of the relay lens 8 is altered by adjusting the lens 8 leftward, rightward, upward or downward in a plane orthogonal to the optical path. This enables the light incident on the liquid-crystal panel 7b to irradiate a minimum required range, consequently obviating the need to widen the irradiation range of the liquid-crystal panel 7b more than is required as conventionally practiced and preventing a reduction in the illuminance of irradiation images.

Of the three relay lenses 80, 8, 81, the middle lens 8 is adjusted according to the foregoing embodiment, whereas other relay lens 80 or 81 may be adjusted.

What is claimed is:

1. A projector for mounting on a chassis including:

a light source, a projection lens for projecting light on a screen, a liquid-crystal panel disposed on an optical path between the projection lens and the light source, a plurality of light separating means positioned on an optical path from the light source for separating light into R, G and B, a relay lens disposed on the longest of optical paths of R, G, B and interposed between one of the light separating means and the projection lens for causing the light on the longest path to reach the projection lens upon concentration, and adjusting means for moving the relay lens upward, downward, leftward or rightward in a plane orthogonal to the optical path thereof, said adjustment means comprising:

a fixed piece containing a vertical plate having means for fixing said fixed piece to said chassis and an integrally formed horizontal plate angularly offset from said vertical plate, an opening formed in said vertical plate for accessing said relay lens, a first movable piece formed of an upright plate and a lateral plate angularly offset from said upright plate, said lateral plate containing an elongated slot to enable lateral movement of said first movable piece on said horizontal plate of said fixed piece, a second movable piece containing a vertically extending support frame containing means for mounting said relay lens, and at least one integral lug angularly offset from said support frame, an adjusting member threadly engageable with said lateral plate of said first movable member, said adjusting member being engageable with said lug for selectively moving said support frame with respect to said first movable piece to effect vertical adjustable movement of said relay lens with respect to said fixed piece, and means on said first movable piece operative to receive a jig accessible from above to impart relative lateral movement between said relay lens and said fixed piece to make the corresponding irradiating light to be incident on the liquid-criptal panel within a minimum required range of radiation on the panel.

2. A projector according to claim 1 wherein said jig-receiving means comprises cooperating recesses formed in said fixed piece and said first movable piece, respectively, for reception of said jig, said recesses providing edges engageable by said jig and being relatively laterally movable upon rotation of said jig.

\* \* \* \* \*